Patented Oct. 27, 1942

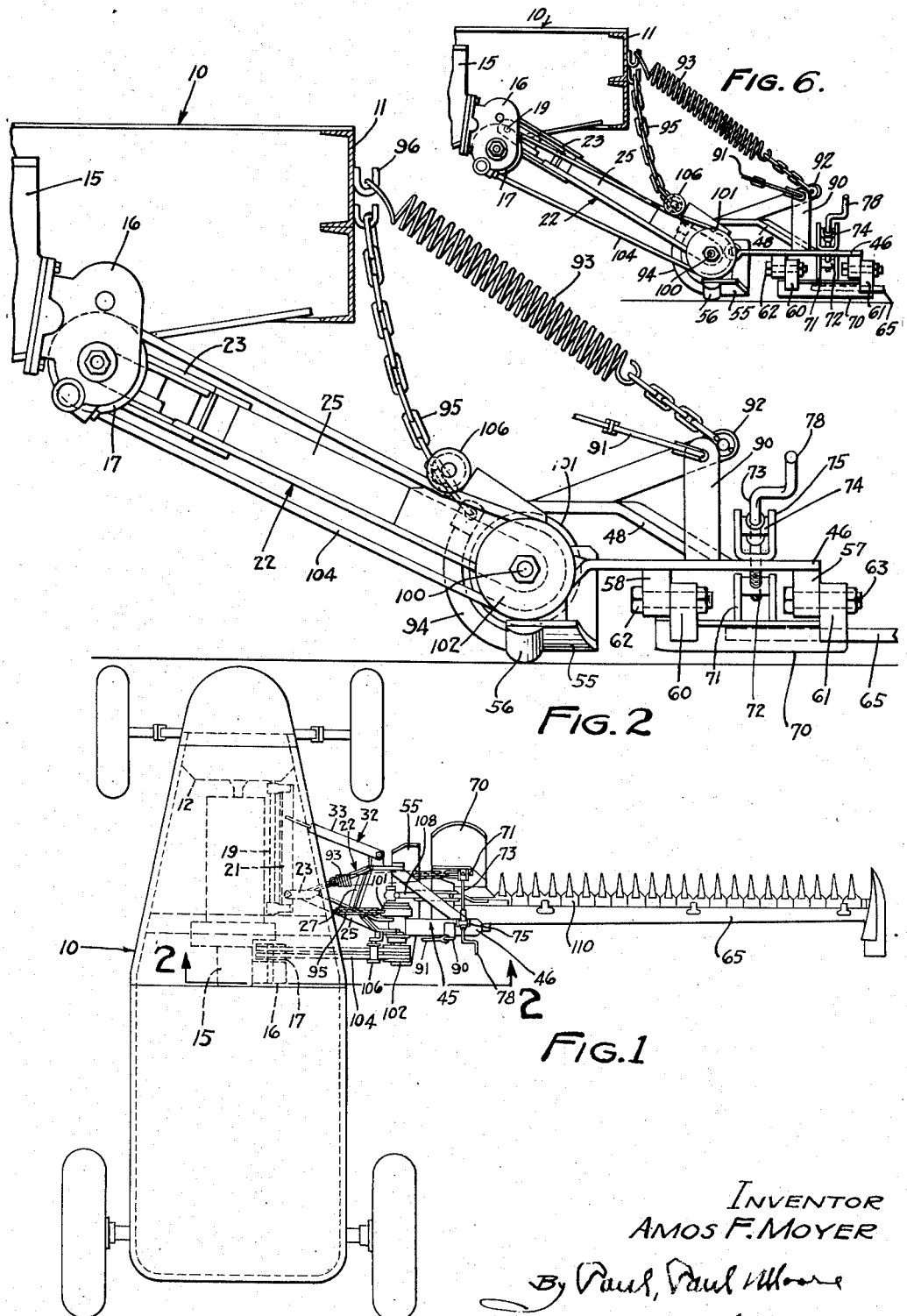

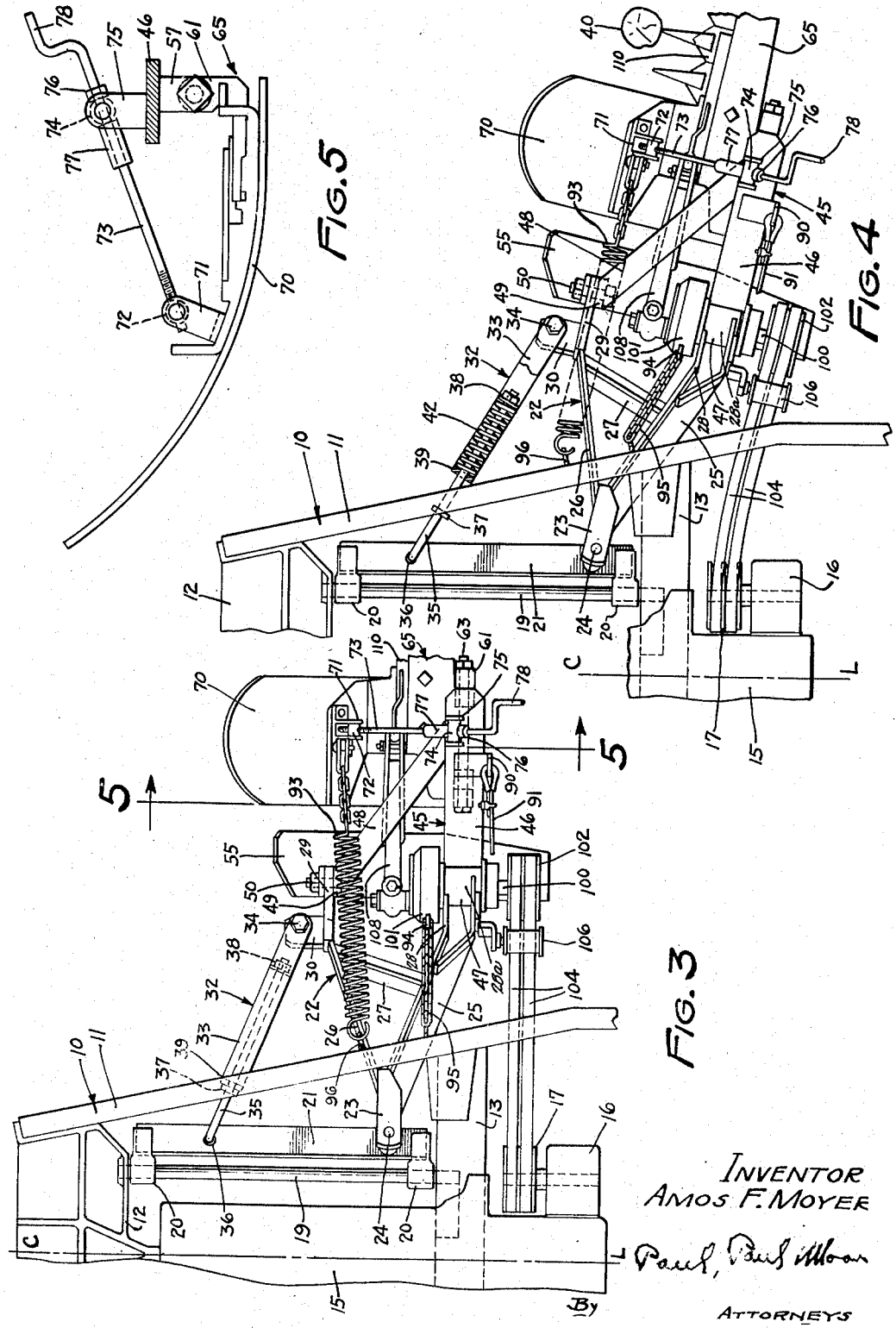

2,299,841

UNITED STATES PATENT OFFICE 2,299,841

POWER MOWING MACHINE

Amos F. Moyer, Minneapolis, Minn., assignor to Toro Manufacturing Corporation of Minnesota, Minneapolis, Minn., a corporation of Minnesota Application March 30, 1940, Serial No. 326,918

4 Claims. (Cl. 56—25)

This invention relates to power driven sickle bar mowing machines and more particularly to machines of this type in which power is transmitted from the vehicle driving engine to the sickle bar attached thereto.

It is an object of the invention to provide an articulated power transmitting means between the power source of the automotive vehicle and the sickle bar. More especially, it is an object of the invention to provide a flexible articulated transmission between a geared vehicle transmission box and the sickle bar in such a manner that the irregular rotary motion incident to sickle reciprocation is cushioned so as to prevent chatter in the geared transmission of the vehicle and thereby prevent destructive pressures upon the gears and other parts of the automotive transmission.

At the same time, it is an object of the invention to provide an articulated connection between the sickle bar and the automotive vehicle so as to permit the sickle bar to oscillate through wide vertical angles conformable to varying contours of the surface being mowed. Such wide vertical angles are important in mowing elevated boulevards, banks, ditches and the like, or where the machine is used for trimming branches of overhanging brush along highways where the desired angles are from vertically upward to 60° or more downward from horizontal.

It is a further object of the invention to provide automatic means for interrupting the delivery of power to the reciprocating sickle bar mower when the sickle bar encounters an obstruction. This is a great advantage on automotive sickles or any machine propelled by an internal combustion engine or of a motor of high speed and inertia because shocks can otherwise be transmitted, with consequent breakage of the parts.

It is likewise an object of the invention to provide means for tilting the finger bar and knife guards upwardly and downwardly in a vertical plane parallel to the path of motion of the sickle bar in order that the knives may be better enabled properly to engage different conditions of growth being cut, and to accomplish this end without adversely effecting the power drive from the automotive vehicle to the reciprocating mower.

In the present invention, the titling of the sickle bar takes place about an axis parallel to the length of the bar and the outer end of the bar is accordingly not caused to move either forwardly or backwardly when the angle of tilting is changed, even through an extreme angle either upwardly or downwardly in the vertical forwardly extending plane. By contrast, tilting of the sickle bar in conventional mowers consists of a forward or backward displacement of the outer end of the sickle bar with consequent serious drawbacks in the work being done.

Other objects of the invention are those inherent in the apparatus illustrated, described and claimed.

The invention is illustrated with reference to the drawings in which

Figure 1 is a plan view showing the general arrangement of the apparatus of the present invention.

Figure 2 is a fragmentary elevational view, partly in section along the line 2—2 of Figure 1, showing the power drive, sickle-supporting swing frame and the sickle head parts of the present invention.

Figure 3 is an enlarged fragmentary plan view of a part of the device shown in Figure 1, showing the sickle bar mowing unit in normal operating condition.

Figure 4 is a view corresponding to Figure 3, but showing the position assumed when the mowing unit strikes an obstruction.

Figure 5 is an elevational view partly in section along the lines 5—5 of Figure 3, showing the means for adjusting the angle of incidence of the sickle bar.

Figure 6 is a fragmentary elevational view of the swing frame and a portion of the vehicle and sickle bar, of a slightly modified form of the invention.

Throughout the drawings, corresponding numerals are used to designate corresponding parts.

The power mowing machine of the present invention includes a power-operated mowing unit of the reciprocating sickle bar type. In the illustrated embodiment of the invention, the sickle is supported by a traction vehicle and the reciprocating sickle is power-operated by the power plant of the vehicle, from the geared transmission thereof.

In the drawings there is illustrated a traction vehicle, generally designated 10, which includes a righthand side frame member 11, front cross-frame member 12, and an intermediate cross-frame member 13. The traction unit is preferably of the automotive type and includes an engine, the geared automotive transmission case of which is illustrated at 15. In Figures 3 and 4 only the parts of the vehicle to the right of the center line C—L are illustrated, it being understood that the chassis is of the conventional four-wheeled automotive type having front steering wheels and rear driving wheels.

The geared automotive transmission case of the vehicle power plant is provided with a power take-off device 16, which is likewise gear driven, the power outlet being V-belt drive pulley 17 for driving the sickle bar unit as hereinafter described.

The sickle bar mowing unit, generally designated 65, is mounted upon a traction vehicle so as to extend laterally therefrom. In the apparatus embodiment of the invention, the mowing unit is carried upon the vehicle by means of a pivot shaft 19, which is carried by the intermediate cross-frame member 13 and the front cross-frame member 12. The shaft 19 is substantially axially aligned with the axis of pulley 17. Upon the shaft, there are pivoted lugs 20, which are solidly connected together by means of a tie brace 21, the tie brace 21 and lugs 20 swinging as a unit around the shaft 19.

Upon the tie brace 21, there is pivotally mounted a swing frame generally designated 22. The swing frame includes a tip 23, which is pivoted by means of bolt 24 passing through the tie brace 21, the fit between the tip 23, the bolt 24 and tie brace 21 being sufficiently close so that the frame 22 is kept from tilting forward or backward.

The frame 22 has a heavy laterally and rearwardly extending frame portion 25, and a somewhat lighter laterally and forwardly extending frame portion 26, which are connected together by means of an intermediate brace 27. The frame pieces 25 and 26 terminate in parallel bracket parts 28 and 29, respectively.

Extending forwardly from the bracket portion 29 is a lug 30, which is connected to the tie brace 21 by a spring clevis link assembly generally designated 32. The spring clevis link 32 includes a long clevis member 33 having its bifurcated end attached to the lug 30 by means of a bolt 34, the end portion 39 of the clevis being pierced so as to receive a rod 35, which is hooked into the eye 36 in the tie brace 21. Mounted upon the rod 35 is a stop collar 37, which limits movement of the clevis member 33 in the direction of the tie brace 21. The free end of the rod 35 is provided with a washer and nut 38, and between the nut 38 and the end 39 of the clevis 33, there is compressed a spring 42, best shown in Figure 4.

The spring 42 abuts against the nut 38 and normally forces the end 39 of the clevis 33 against the stop collar 37 thus normally forming a link of fixed length, the length of the link 32 being such that the swing frame 22 is normally held in an extending position at right angles to the axis of movement of the traction vehicle, this position being shown in Figure 3. However, when the sickle bar mowing unit, generally designated 65, runs against an obstruction 40 during the mowing operation, as illustrated in Figure 4, the entire sickle bar unit and swing frame is permitted to pivot backwardly around the pivot 24. In so doing, the spring 42 is further compressed.

The parallel extending arms 28 and 29 form a longitudinal axis about which the sickle bar mounting frame, generally designated 45, is pivoted for normal movement in a vertical plane.

The swing frame member 25 is joined at 28 to a journal 28a. The sickle bar mounting frame 45 consists of an outwardly extending member 46, having an eye 47 which is journalled upon the member 28a of the swing frame. Attached to member 46 is a forwardly inclined brace member 48 which is journalled in the member 29 of the swing frame, the member 48 having a downwardly extending piece 49 which is pierced to receive a bolt 50 passing through the member 29 of the swing frame. Beneath the journal 28a and bolt 50, there is mounted a shoe 55 which unites the lower end of piece 49 with a member depending from eye 47. Shoe 55 is turned up at both the forward and rearward ends, the shoe being sufficiently long to protect mechanisms on the swing frames. The underside of the shoe is provided with a skid 56 as shown in Figure 2.

Extending downwardly from the member 46 of the sickle bar mounting frame are lugs 57 and 58 spaced to receive a pair of upstanding ears 60 and 61 on the sickle bar mowing unit, generally designated 65. Bolts 62 and 63 connect the pairs of ears 58—60 and 57—61 respectively and form a pivotal axis longitudinally of the sickle bar about which the sickle bar may be tilted in a plane parallel to the path of motion so as to vary the angle of incidence of the mower with respect to the grass or weeds being cut.

The sickle bar mowing unit is provided with a forwardly extending broad shoe 70, upon the middle front portion of which there is mounted a bifurcated bracket 71 of the tilt adjuster. The bracket 71 is pierced to receive a round pin 72 which is transversely drilled and threaded to receive the adjustment screw 73. The adjustment screw extends upwardly and passes through a second pin 74 of circular cross-section, which is held in a bifurcated bracket 75 on the upper portion of outwardly extending member 46 of the sickle bar mounting frame. Screw 73 is provided with a pair of collars 76 and 77, which serve to prevent longitudinal movement with respect to the pin 74, and is formed into a crank-shape at the rear end, as shown at 78.

The crank 78 permits easy rotation of the screw 73 and since the rod cannot move longitudinally with respect to the part 74 mounted in the bifurcated bracket 75, turning of the screw in member 72 moves the bracket 71, and hence the front end of the sickle bar, either toward or away from the bracket 75. This tilts the unit 65 and causes a change in the angle of incidence of the knives and knife guards thereon with respect to the surface being cut.

Upon the upper surface of the member 46, there is mounted upwardly extending brackets 90 and 92, to which a lift cable 91 and spring 93 are, respectively, attached. The upper end of the spring 93 is flexibly attached to the hook 96 on the side frame member 11. Attached to the shoe 55 is a rearwardly and upwardly extending horn 94 to which a chain 95 is attached, the upper end of the chain being connected to frame member 11 rearwardly of hook 96.

Concentric with the eye 47 on the sickle bar mounting frame piece 46, and within the journal on the swing frame member 29, there is rotatably mounted a pitman shaft 100 having a pitman wheel 101 at its forward end, and a double groove V-belt pulley 102 at its rear end. The pulley 102 is aligned with the pulley 17 of the power take-off 16, and a pair of V-belts 104 are mounted for operation over the pulleys, tension being maintained constant by an idler pulley 106.

The pitman wheel 101 is connected by a pitman link 108 to the sickle knife 110 of the sickle bar assembly 65, and accordingly as the shaft 100 and pitman wheel 101 are rotated, the pitman link 108 and the attached sickle knife are oscillated back and forth in the sickle bar. The sickle bar mounting frame 45 may be rotated in a vertical plane about an axis through the journal on the end of the swing frame part 28, this axis also being passed through bolt 50. Since the pitman shaft 100 is concentric with this axis, angular movement of the sickle bar upward or downward does not effect the oscillation of the knife in the sickle bar. Therefore, the sickle bar may be operated with equal facility in any position from the vertically upward position through any intermediate angular positions approaching the vertical downward position.

The axis of shaft 19 is substantially the same as the axis of pulley 17, and pitman shaft 100 is fixed with respect to the outer end of the swing frame 22. Therefore, as the swing frame is moved in a vertical plane about the axis of the shaft 19 as a center, the V-belts 104 are maintained under constant tension, and accordingly power is uniformly and efficiently transmitted to the pitman shaft 100 regardless of the vertical position of the swing frame 22 in its vertical plane of movement.

The clevis link 32 normally maintains the swing frame 22, and the sickle bar in a vertical plane at right angles to the axis of rod 19. In this normal position, the belts 104 are maintained in strict alignment and under proper tension for transmitting power from the power take-off 16 to the pitman shaft 100. However, when the sickle bar unit 65 hits an obstruction such as stone 40, and the swing frame-sickle bar unit is pivoted backwardly as shown in Figure 4, the pitman shaft pulley 102 is moved, not only backwardly, but also toward the power take-off pulley 17, this effect being due to the fact that the pivot point (bolt 24) about which the swing frame and sickle bar pivot backwardly, is ahead of the plane of pulleys 17 and 102. This movement of pulley 102 automatically loosens belt 104 and the transmission of power from pulley 17 to pulley 102 is automatically interrupted. Therefore, when the sickle bar 65 hits such an obstruction 40, the rotation of the pitman shaft 100 and the oscillation of the knife of the sickle bar 65 are automatically stopped.

Since the swing frame 22 is snugly connected to the tie frame member 21 for swinging about the bolt 24, the frame is held from tilting and the axis of shaft 100 is therefore normally kept parallel to the common axis through rod 19 and drive pulley 17. Accordingly, there is no twisting of the belts 104 and the belt tension is constant. However, by turning the crank 78 the angle of incidence of the mowing unit 65 may be changed, tilting being effected about an axis longitudinally of the sickle bar 65, through bolts 62 and 63, this axis being at right angles to the common axis of shaft 100 and bolt 50. Therefore, adjustment of the angle of incidence of the mowing unit produces no twisting effect upon the belts 104 and the mowing unit is efficiently operated regardless of the angle of incidence of the mowing unit 65.

It will further be noted that, since the pivots 62 and 63 engage the sickle bar mounting frame 45, and swing with it about the axis of journal 28a and bolt 50 in permanent alignment with the length of the cutter bar assembly 56, the actuation of the tilting mechanism does not cause the bar assembly to deviate from the vertical transverse plane in which the bar normally moves upwardly and downwardly. In previous sickle bar tilting mechanisms, the tilting pivot does not move with the bar about the pivot provided for oscillating movement, but is on the member here corresponding to the swing frame. Consequently such devices will displace the bar from the vertical plane if actuated when the sickle is partially elevated, as in cutting a bank.

Hoisting of the sickle bar may be accomplished by applying a force on cable 91 by any suitable hoisting mechanism. As the sickle bar is moved upwardly, it tends to rotate the horn 94 about the axis of the eye 47 and pitman shaft 100, but since the horn 94 is fixedly coupled to the hook 96 by an inextensible chain 95, the swing frame is automatically moved upwardly. Additional adjustable lift mechanism for varying the datum position of chain 95 may be provided, if desired, as shown in the co-pending application of John S. Clapper, Ser. No. 320,902, filed February 26, 1940.

Other means for lifting the swing frame either separately from or simultaneously with the oscillation of the sickle bar to upright position, may be employed.

Obvious modifications may be made in the details of the present disclosure without departing from the spirit of the invention described and claimed. Thus as shown in Figure 6, the power transmitting pulley shaft may be journalled closely adjacent, though not concentric, with the pivotal connection of the sickle bar mounting bracket or the swing frame. These and other details of the invention being obviously variable without departure from the essential features of the invention.

I claim:

1. An improved power mowing machine comprising a chassis frame, a swing and sickle bar connected together endwise, and the unit being connected to the chassis frame so as to extend laterally therefrom the sickle bar being outermost, resilient means connecting the swing frame and chassis frame for normally holding the swing frame and sickle bar extending laterally but being deflectable to allow the swing frame and sickle bar as a whole to swing backwardly when the sickle bar hits an obstruction, a sickle bar pitman drive shaft journalled in the swing frame near the sickle bar and drive-connected to the sickle bar, a power drive pulley on the chassis substantially aligned with but spaced rearwardly from the swing frame-sickle bar unit connection to the chassis frame, a driven pulley mounted on the pitman shaft in alignment with the drive pulley and a friction belt mounted for running in said pulleys.

2. An improved power mowing machine comprising a chassis frame, a swing frame connected to the chassis frame and extending laterally from the chassis frame, a sickle bar mowing unit mounted on the swing frame and extending outwardly therefrom, resilient means for normally holding the swing frame and the sickle bar attached thereto in a normal plane at right angles to the chassis but allowing backward movement when the sickle bar strikes an obstruction, a pitman shaft journalled in the swing frame adjacent one end of the swing frame, a drive shaft mounted on the chassis frame adjacent the other end of the swing frame, aligned wheels mounted on said shafts rearwardly of the swing frame connection to the chassis frame, and a friction drive belt mounted for running in said wheels, whereby the pulleys will be brought towards each other and the belt slipped when the sickle bar is deflected backwardly by an obstruction.

3. An improved power mowing machine comprising a chassis frame, a swing frame, a universal connection between one end of the swing frame and the chassis frame, deflectable brace means normally holding the swing frame against abnormal backward movement out of a vertical plane of normal movement at right angles to the axis of the chassis frame, a sickle bar mowing unit pivotally mounted on the swing frame, the axis of said sickle bar mounting on the swing frame being at right angles to said vertical plane when the swing frame is in its normal position, a pitman shaft journalled in the swing frame the axis of said shaft being at right angles to said vertical plane of normal movement, drive pulley on the chassis frame the axis of said drive pulley being adjacent the universal connection of the swing frame and perpendicular to the vertical plane of normal movement of the swing frame, a driven pulley on the pitman shaft, said drive pulley and driven pulley being spaced backwardly from said universal connection, and a friction belt mounted for running over the pulleys.

4. An improved power mowing machine comprising a chassis frame, a swing frame, a universal connection between one end of the swing frame and the chassis frame, deflectable brace means normally holding the swing frame against abnormal backward movement out of a vertical plane of normal movement at right angles to the longitudinal axis of the chassis frame, a sickle bar mowing unit pivotally mounted on the swing frame, the axis of said sickle bar mounting on the swing frame being at right angles to said vertical plane when the swing frame is in normal position, a pitman shaft having a pitman wheel thereon journalled in the swing frame, the axis of said wheel and shaft being at right angles to the vertical plane, drive pulley on the chassis frame the axis of said drive pulley being adjacent the universal connection of the swing frame and perpendicular to the plane of normal movement of the swing frame, a driven pulley on the pitman shaft, and a friction belt mounted for running over the pulleys, each of said pulleys being spaced rearwardly with respect to said plane of normal movement, whereby the distance between the pulleys will be decreased and the belt automatically slipped when the sickle bar and swing frame are deflected backwardly from said normal plane.

AMOS F. MOYER.